(12) United States Patent
Lambourne

(10) Patent No.: US 11,655,939 B2
(45) Date of Patent: May 23, 2023

(54) COMPOSITE STORAGE TANK FOR GASEOUS HYDROGEN

(71) Applicant: ROLLS-ROYCE plc, London (GB)

(72) Inventor: Alexis Lambourne, Belper (GB)

(73) Assignee: Rolls-Royce PLC, London (GB)

( * ) Notice: Subject to any disclaimer, the term of this patent is extended or adjusted under 35 U.S.C. 154(b) by 18 days.

(21) Appl. No.: 17/403,090

(22) Filed: Aug. 16, 2021

(65) Prior Publication Data

US 2022/0065398 A1 Mar. 3, 2022

(30) Foreign Application Priority Data

Sep. 3, 2020 (GB) ..................................... 2013873

(51) Int. Cl.
  *F17C 1/00* (2006.01)
  *F17C 13/02* (2006.01)
  (Continued)

(52) U.S. Cl.
  CPC .............. *F17C 1/005* (2013.01); *B60L 50/70* (2019.02); *B64D 27/10* (2013.01); *B64D 27/24* (2013.01); *B64D 37/06* (2013.01); *F17C 13/02* (2013.01); *H01M 8/04201* (2013.01); *B60L 2200/10* (2013.01); *B64D 2027/026* (2013.01); *F17C 2201/0109* (2013.01); *F17C 2201/035* (2013.01); *F17C 2203/0604* (2013.01);
  (Continued)

(58) Field of Classification Search
  CPC .......... F17C 1/005; F17C 13/02; B60L 50/70; B64D 27/10; B64D 27/24; B64D 27/02; B64D 37/06; B64D 37/02; H01M 8/04201

USPC ........ 220/589, 588, 586, 581; 340/605, 603; 244/135 R, 135 A
See application file for complete search history.

(56) References Cited

U.S. PATENT DOCUMENTS 2,273,736 A * 2/1942 Gwynne ................ B21D 51/24
                                               219/137 R
5,816,426 A * 10/1998 Sharp ................... B65D 90/507
                                                220/62.19
(Continued)

FOREIGN PATENT DOCUMENTS

DE           10154145 C1    6/2003
DE       202009008026 U1   10/2010
(Continued)

OTHER PUBLICATIONS

Great Britain search report dated Jan. 26, 2021, issued in GB Patent Application No. 2013873.2.
European search report dated Jan. 17, 2022, issued in EP Patent Application No. 21189254.

*Primary Examiner* — Robert J Hicks

(57) ABSTRACT

A composite storage tank comprises a composite wall enclosing a gas storage volume and defining a cylindrical portion of the tank. The composite wall incorporates first and second sets of metallic fibres each of which is susceptible to embrittlement by hydrogen and has ends extending through the exterior surface of the composite wall. By measuring the electrical resistances of the metallic fibres, a measure of the amount of hydrogen that has leaked through the composite wall over a period of time, and the present physical condition of the tank, may be determined. The approximate axial and azimuthal coordinates of a particular leakage point may also be determined.

11 Claims, 4 Drawing Sheets

(51) Int. Cl.
  B60L 50/70 (2019.01)
  B64D 27/10 (2006.01)
  B64D 27/24 (2006.01)
  H01M 8/04 (2016.01)
  B64D 37/06 (2006.01)
  H01M 8/04082 (2016.01)
  B64D 27/02 (2006.01)
  H01M 8/10 (2016.01)

(52) U.S. Cl.
  CPC ............ *F17C 2203/066* (2013.01); *F17C 2203/0614* (2013.01); *F17C 2203/0636* (2013.01); *F17C 2221/012* (2013.01); *F17C 2260/011* (2013.01); *F17C 2260/038* (2013.01); *F17C 2270/0186* (2013.01); *H01M 2008/1095* (2013.01); *H01M 2250/20* (2013.01)

(56) References Cited

U.S. PATENT DOCUMENTS

| | | |
|---|---|---|
| 6,382,232 B1 | 5/2002 | Portmann |
| 2003/0070487 A1 | 4/2003 | Dacosta et al. |
| 2010/0012662 A1* | 1/2010 | Robbins ............ B65D 88/06 220/567.1 |
| 2012/0234840 A1* | 9/2012 | Strassburger ........ B29C 70/24 156/196 |
| 2013/0082066 A1 | 4/2013 | Prakash et al. |
| 2018/0274725 A1 | 9/2018 | Chung et al. |

FOREIGN PATENT DOCUMENTS

| | | |
|---|---|---|
| DE | 102014003587 A1 | 9/2015 |
| FR | 2976045 A1 | 12/2012 |

\* cited by examiner

COMPOSITE STORAGE TANK FOR GASEOUS HYDROGEN

CROSS-REFERENCE TO RELATED PATENT APPLICATIONS

This specification claims the benefit of priority from British Patent Application No. GB 2013873.1, filed on Sep. 3, 2020, the entire contents of which are hereby incorporated by reference.

BACKGROUND

Field of the Invention

The disclosure relates to composite gas storage tanks, particularly composite storage tanks for storing gaseous hydrogen at high pressure, for example 300 bar or greater.

Description of Related Art

Organic matrix composite storage tanks for storing gaseous hydrogen at high pressure are of interest for hydrogen-powered transport applications (road, rail, aerospace) in which motive power is provided by proton-exchange membrane (PEM) fuel cells. Motive power in aerospace applications could alternatively or additionally be provided by one or more hydrogen-burning gas turbine engines. Organic matrix composite storage tanks are especially attractive for gaseous hydrogen storage in aerospace applications owing to their potential for achieving high gravimetric efficiencies of 10% or more. A so-called 'Type IV' tank comprises a carbon fibre composite wall, or shell, and a polymer liner (e.g. of polypropylene or polyethylene); a 'Type V' tank comprises a carbon fibre composite wall but does not have a polymer liner.

When a composite storage tank is used to store hydrogen, the stored hydrogen tends to leak through the composite wall, and the liner if present, due to the very small size a hydrogen molecule (0.12 nm). The rate at which hydrogen leaks through the composite wall of a composite storage tank tends to increase over time with use of the tank because repeated charging and discharging cause microcracking and delamination within the composite shell. In order to reduce wastage of gaseous hydrogen fuel within the tank, it is desirable to be able to be able to find the rate at which hydrogen leaks from a tank during use and/or how much hydrogen has leaked from the tank over time. The tank can then be removed from service and replaced when the rate of leakage exceeds a threshold. Presently, composite tanks used in transport applications (typically automotive applications) provide no means for measuring the rate at which hydrogen leaks from a tank, or how much hydrogen has leaked over time, or for establishing an indication of the physical condition of the composite wall of the tank. The rate of leakage of a tank can only be found presently by taking the tank out of service and subjecting it to a known test, for example a helium leak test, vacuum test or hydrogen sensor (sniffing) test; in these tests the tank is removed from service even if its performance and condition are subsequently found to be satisfactory. Chemo-chromic indicators can provide an indication of the simple fact of leakage of gaseous hydrogen from a tank, but do not provide information on the current rate of leakage or historical leakage from the tank.

SUMMARY

According to an example, a composite storage tank for gaseous hydrogen comprises a composite wall enclosing a gas storage volume and a metallic fibre which is susceptible to embrittlement by hydrogen incorporated within the composite wall, wherein ends of the metallic fibre extend through the exterior surface of the composite wall. The extent of historical leakage of hydrogen from the tank, at the position of the metallic fibre, and its current physical condition, may be inferred from the electrical resistance of the metallic fibre.

The composite wall may define a cylindrical portion of the tank and the metallic fibre may extend substantially parallel to the central longitudinal axis of the cylindrical portion of the tank. The condition of the cylindrical portion of the tank at a specific azimuthal position, and the historical leakage at that azimuthal position may then be inferred from the electrical resistance of the metallic fibre.

The composite wall may include a plurality of metallic fibres each of which is susceptible to embrittlement by hydrogen and which extends substantially parallel to the central longitudinal axis of the cylindrical portion of the tank, the ends of each metallic fibre extending through the exterior surface of the composite wall, and each metallic fibre being located at a respective azimuthal position with respect to the central longitudinal axis of the cylindrical portion of the tank. The condition of the composite wall and the history of hydrogen leakage at each of a plurality of azimuthal positions within the composite shell may then be deduced from the electrical resistances of the fibres. The azimuthal position of a single leakage point may also be determined.

The composite wall may define a cylindrical portion of the tank, the metallic fibre extending azimuthally at a single axial position with respect to the central longitudinal axis of the cylindrical portion of the tank, ends of the metallic fibre extending through the exterior surface of the composite wall, thereby allowing the condition of the tank and the history of hydrogen leakage at that axial position to be determined from the electrical resistance of the metallic fibre. The composite wall may include a plurality of metallic fibres each of which is susceptible to embrittlement by hydrogen and which extends azimuthally at a respective axial position with respect to the central longitudinal axis of the cylindrical portion of the tank, ends of each metallic fibre extending through the exterior surface of the composite wall. The condition and history of hydrogen leakage at each of a plurality of axial positions along the cylindrical portion of the tank may then be inferred from the electrical resistances of the fibres. The axial position of a single leak point may also be determined.

The composite wall may define a cylindrical portion of the tank and include first and second sets of metallic fibres, each metallic fibre being susceptible to embrittlement by hydrogen, metallic fibres of the first set each extending substantially parallel to the central longitudinal axis of the cylindrical portion of the tank at a respective azimuthal position and metallic fibres of the second set each extending azimuthally at a respective axial position with respect to the central longitudinal axis of the cylindrical portion of the tank, ends of each metallic fibre extending through the exterior surface of the composite wall. The axial and azimuthal positions of a leak point may be determined from the electrical resistances of the metallic fibres.

The composite wall may comprise an organic matrix composite.

The composite storage tank may comprise a polymer liner in contact with the interior surface of the composite wall.

At least one metallic fibre incorporated within the composite wall may be pre-stressed.

According to an example, a composite storage tank system comprises a composite storage tank as described herein and means for measuring the electrical resistance of the metallic fibre comprised in the composite wall of the composite storage tank.

According to an example, an aircraft comprises a composite storage tank system as described herein and at least one of a polymer electrolyte membrane (PEM) fuel cell and a hydrogen-burning gas turbine engine, the PEM fuel cell and/or the gas turbine engine being arranged to receive gaseous hydrogen from the composite storage tank of the composite storage tank system.

DESCRIPTION OF THE DRAWINGS

Embodiments of the invention are described below by way of example only and with reference to the accompanying drawings in which.

DETAILED DESCRIPTION

Figures 1A, 1B, 1C:
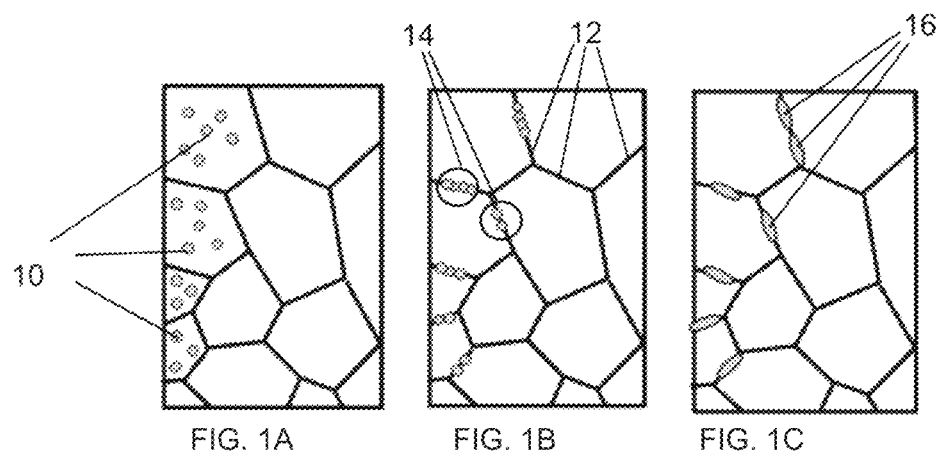
FIG. 1A illustrates a first stage in the process of embrittlement of metal in the presence of gaseous hydrogen.
FIG. 1B illustrates a second stage in the process of embrittlement of metal in the presence of gaseous hydrogen.
FIG. 1C illustrates a third stage in the process of embrittlement of metal in the presence of gaseous hydrogen.

Many metals embrittle on contact with hydrogen. Referring to FIG. 1A, at room temperature, hydrogen atoms 10 can be absorbed by carbon steel alloys & other metals. Hydrogen which is absorbed may be present in either atomic or molecular form. Given enough time, the hydrogen diffuses to metal grain boundaries 12 and forms bubbles 14 at these metal grain boundaries as shown in FIG. 1B. These bubbles coalesce (FIG. 1C) to form larger bubbles 16 which exert pressure on the corresponding metal grains. The pressure can increase to levels where the metal has reduced ductility and strength.

Hydrogen can enter and diffuse through steel even at room temperature. This can occur during various manufacturing and assembly operations or operational use—anywhere that metal comes into contact with atomic or molecular hydrogen. In common metal processing operations, there is a possibility of absorption of hydrogen during acid pickling and electroplating operations where hydrogen is evolved in chemical reactions. Hydrogen absorption can also occur when a component is in service if steel is exposed to acids or if corrosion of the steel occurs.

As a result of hydrogen adsorption, hydrogen embrittlement occurs when a metal becomes brittle as a result of the introduction and diffusion of hydrogen into the metal. The degree of embrittlement is influenced both by the amount of hydrogen absorbed and the microstructure of the metal. Microstructures which bestow high strength, often monitored by hardness level, or having specific distributions of grain boundary particles or inclusions, can result in increased susceptibility to embrittlement. This phenomenon usually becomes significant when it leads to cracking. This happens when sufficient stress is applied to a hydrogen-embrittled object. Such stress states can be caused both by the presence of residual stresses, associated fabrication operations such as forming and welding, and applied service stresses. The severity of hydrogen embrittlement is a function of temperature: most metals are relatively immune to hydrogen embrittlement, above approximately 150° C.

Intergranular cracking occurs when cracks form and grow along weakened grain boundaries in a metal. In the case of hydrogen embrittlement, the hydrogen bubbles at the grain boundaries of the alloy weaken the metal. There are three key requirements for failure due to hydrogen embrittlement:

(i) a susceptible material;
(ii) exposure to an environment that contains hydrogen; and
(iii) the presence of tensile stress on the component.

High-strength steels with tensile strength greater than about 145 ksi (1000 MPa) are the alloys most vulnerable to hydrogen embrittlement. Normally these are used as 'design rules' to avoid hydrogen embrittlement failures, however this invention uses the hydrogen embrittlement effect as the sensing element in a hydrogen tank.

Figure 2:
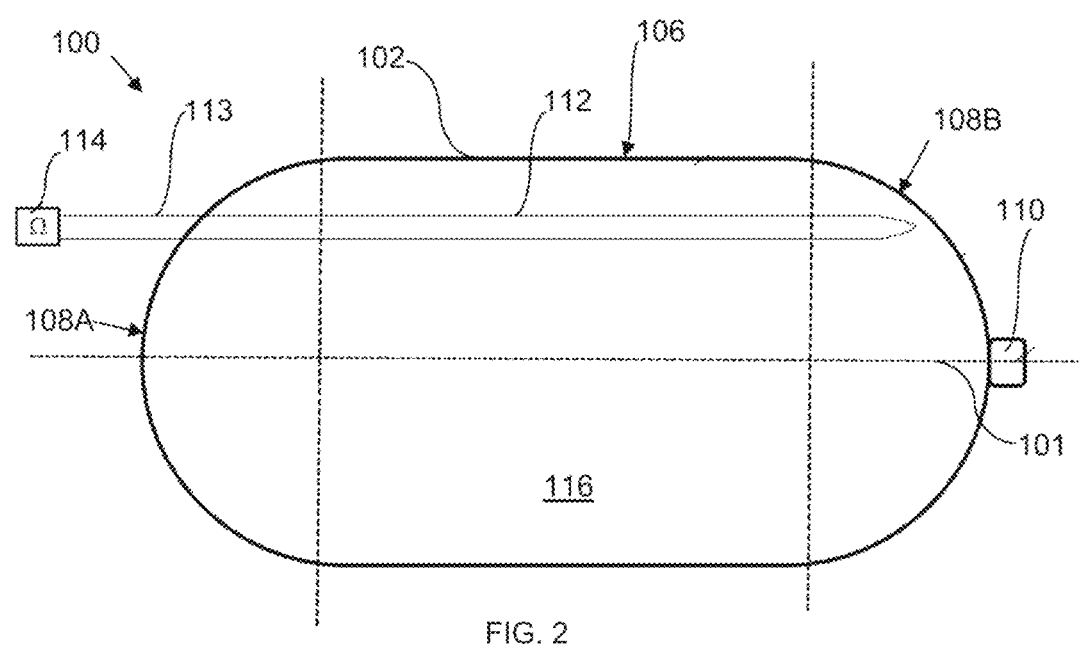
FIG. 2 shows a longitudinal section of a first example composite storage tank of the invention.
Figure 3:
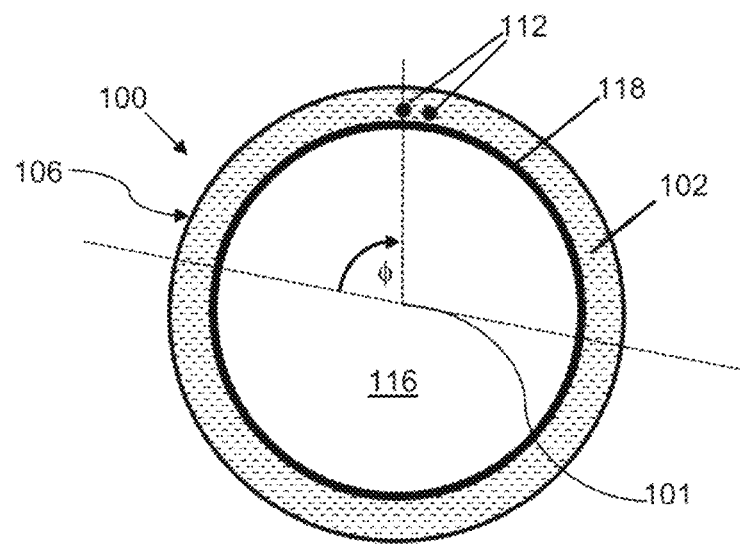
FIG. 3 shows a transverse section through the tank of FIG. 2.

Referring to FIGS. 2 and 3, a first example organic composite storage tank 100 of the invention comprises an organic matrix composite wall 102 defining a storage volume 116 for storing gaseous hydrogen. The tank 100 comprises a polymer liner 118 (e.g. polypropylene or polyethylene) in contact with the internal surface of the composite wall 102, i.e. the tank 100 is a so-called "Type IV" tank. The tank 100 comprises a cylindrical central section 106 formed integrally with domed or hemispherical end sections 108A, 108B and has a central longitudinal axis 101. A metallic coupling element 110 passes through the composite wall 102 and the polymer liner 118 at the end section 108B and allows for filling and emptying of the tank 100. A metallic fibre 112, which is selected specifically for its susceptibility to embrittlement in the presence of hydrogen, is incorporated into the lay up of the tank 100 and has a lead-out region 113 extending beyond the tank 100 to an electrical interrogation unit 114. The metallic fibre 112 is located within the composite wall 102 at a radial position r greater than that of the polymer liner and extends longitudinally and substantially parallel to the central longitudinal axis 101 of the tank 100. The azimuthal position of the metallic fibre 112 over the cylindrical central section 106 is indicated by $\phi$ in FIG. 3.

The metallic fibre 112 may be formed from any one of a range of metallic alloys which are susceptible to hydrogen embrittlement, for example high strength steel (typically greater than 32 Rockwell C hardness/UTS >1000 MPa), stainless steel, titanium alloy (e.g. Ti 6-4), vanadium, vanadium alloys and nickel alloys. Preferably the metallic fibre 112 is thin (less than 100 μm in diameter) and laid into the composite wall 102 with a pre-stress applied to it in order to increase its stress sensitivity and its propensity to break during hydrogen embrittlement. During fabrication of the tank 100, the metallic fibre 112 is co-wound or laid-up into the structure of the tank 100 with a tensile pre-stress applied to it during lay-up and cure.

Figure 4:
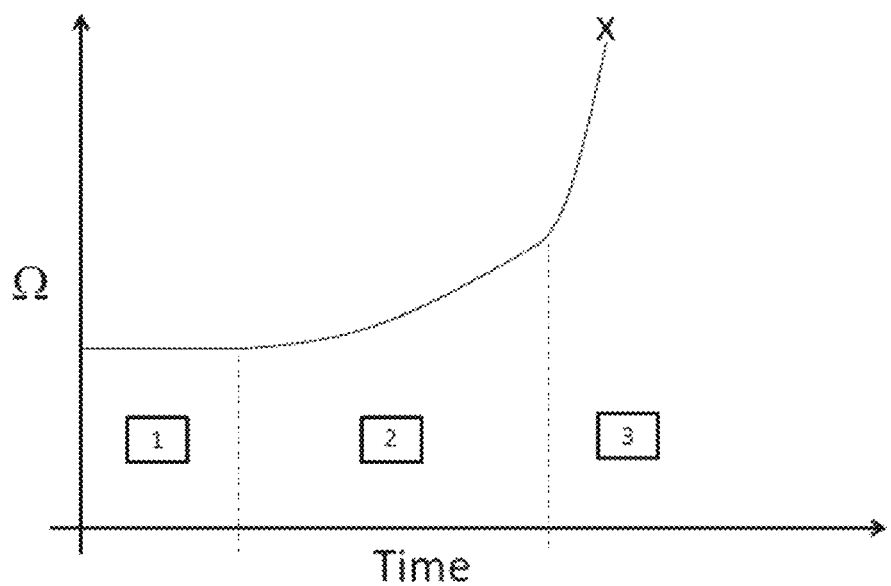
FIG. 4 illustrates variation in resistance of a metallic fibre comprised in the FIG. 2 tank.

FIG. 4 shows the variation in resistance of the metallic fibre 112 as a function of time. During normal operation of the tank 100, the metallic fibre 112 exhibits no change in electrical resistance as measured by the interrogator 114. This corresponds to portion 1 of the graph shown in FIG. 4. If the polymer liner 118 is defective, hydrogen will diffuse through the composite wall 102 and interact with the metallic fibre 112, embrittling it. The rate at which hydrogen diffuses through the composite wall 102 depends on the extent of any cracking or delamination in the composite wall 102. This diffusion results in an increase in electrical resistance of the metallic fibre 112, as indicated by portion 2 of the graph of FIG. 4. Strain cycles on the tank 100 resulting from repeated charging/discharging cycles, combined with pre-stress in the metallic fibre 112, will eventually cause the metallic fibre 112 to undergo brittle failure, indicated by portion 3 of the graph in FIG. 4. The electrical interrogator 114 will detect this as an open circuit (infinite) resistance. The resistance of the metallic fibre 112 therefore represents an integrated history of leakage through the polymer liner 118 and the composite wall 102.

Figure 5:
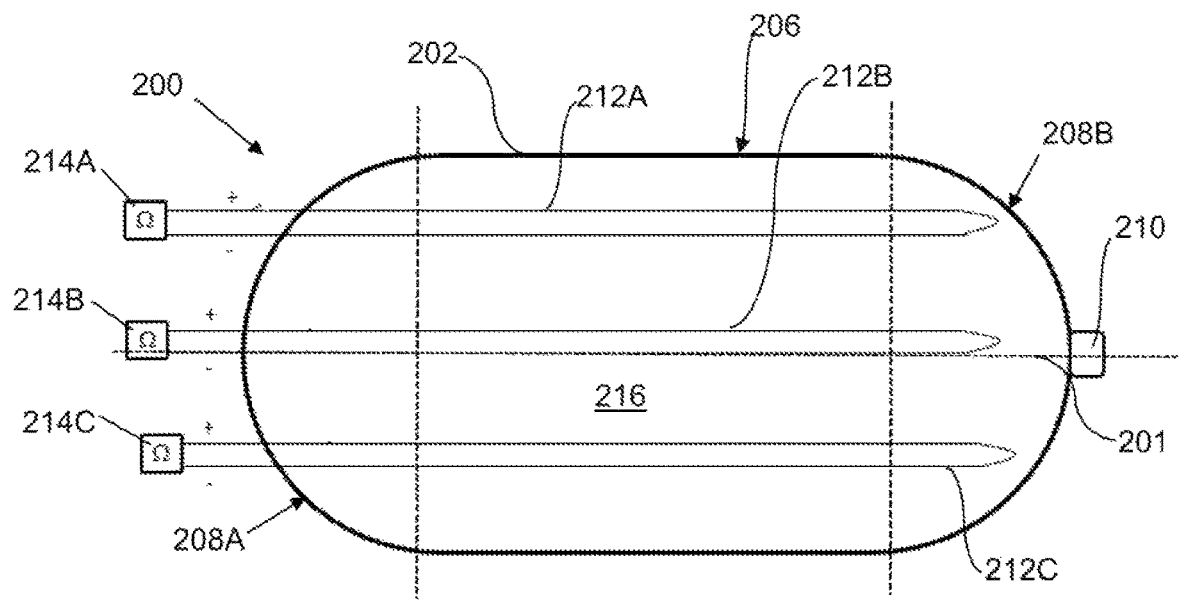
FIG. 5 shows a longitudinal section though a second composite storage tank of the invention.

FIG. 5 shows a longitudinal section though a second example organic composite storage tank 200 of the invention. Parts of the tank 200 which correspond to parts of the tank 100 of FIGS. 2 and 3 are labelled with reference signs differing by 100 from those labelling the corresponding parts in FIGS. 2 and 3. The tank 200 has multiple metallic fibres such as 212A, 212B, 212C at different azimuthal positions within the composite wall 202 of the tank 200. Electrical interrogators such as 214A, 214B, 214C therefore provide information on leaks over a range of azimuthal positions within the composite wall 202. The azimuthal position of a particular leakage point may be determined.

Figure 6:
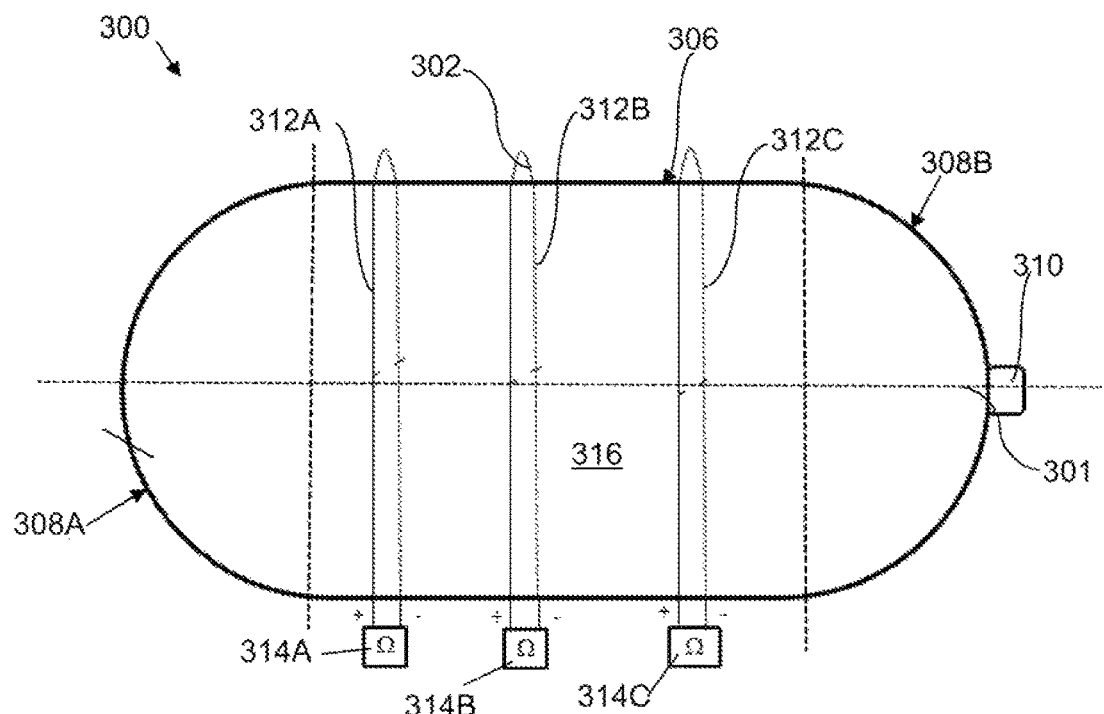
FIG. 6 shows a longitudinal section though a third composite storage tank of the invention respectively.

FIG. 6 shows a longitudinal section through a third example organic composite storage tank 300 of the invention. Parts of the tank 300 which correspond to parts of the tank 100 of FIGS. 2 and 3 are labelled with reference signs differing by 200 from those labelling the corresponding parts in FIGS. 2 and 3. The tank 300 has multiple metallic fibres such as 312A, 312B, 312C at different axial positions within the composite wall 202 of the tank 200. Electrical interrogators such as 314A, 314B, 314C therefore provide information on leaks over a range of axial positions within the composite wall 202. The axial position of a particular leakage point may be determined.

Figure 7:
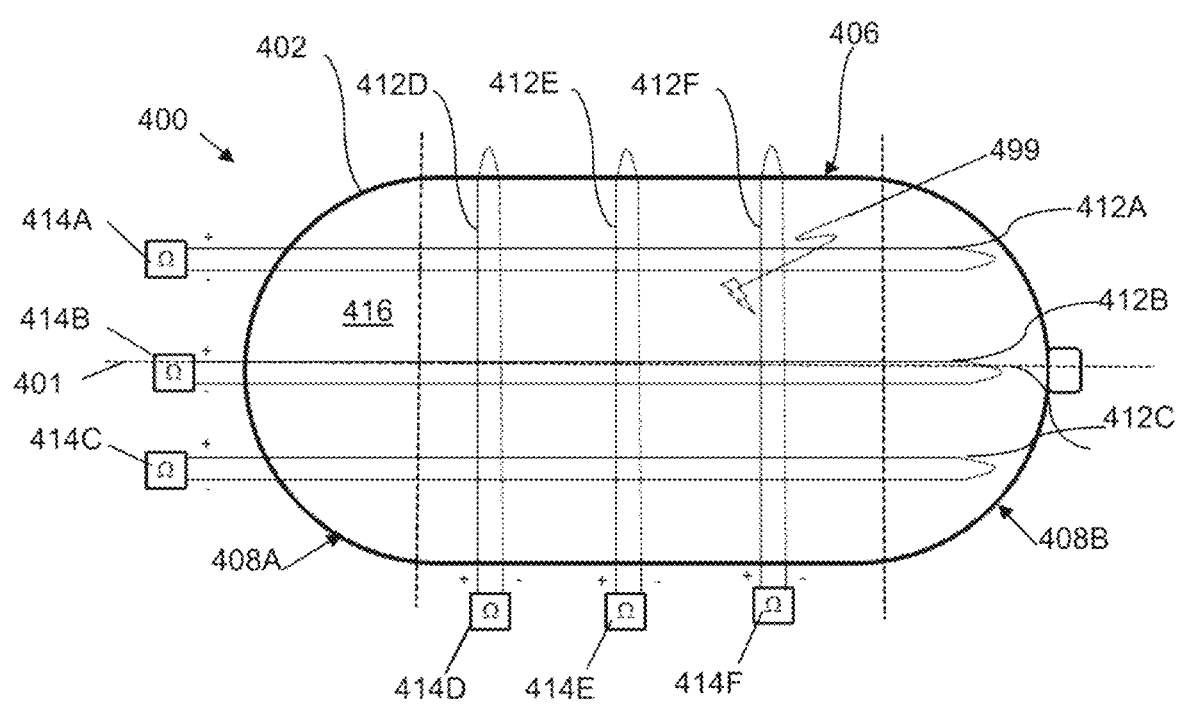
FIG. 7 shows a longitudinal section of a fourth composite storage tank of the invention.

FIG. 7 shows a longitudinal section through a fourth example organic composite storage tank 400 of the invention. Parts of the tank 400 which correspond to parts of the tank 100 of FIGS. 2 and 3 are labelled with reference signs differing by 300 from those labelling the corresponding parts in FIGS. 2 and 3. The tank 400 has multiple metallic fibres such as 412A, 412B, 412C at different azimuthal positions within composite wall 402. Multiple metallic fibres such as 412D, 412E, 412F are provided at different axial positions. Electrical interrogators such as 414A-F therefore provide information on leaks over a range of azimuthal and axial positions. The azimuthal and axial positions of a particular leakage point such as 499 may be determined in the case of the tank 400; for example a leakage point 499 will give rise to increases in the electrical resistance of the metallic fibres 412A and 412F but will not affect the electrical resistances of the other metallic fibres 412B-E.

The composite storage tanks 100, 200, 300, 400 provide for leakage to be detected within the composite walls of the tanks and also leakage resulting from defects in the polymer liners of the tanks 100, 200, 300, 400. Early warning of tank failure as a result of leakage is therefore provided for. The metallic fibres used provide a simple, robust and cheap mechanism for detecting leakage of hydrogen.

Although metallic fibres in tanks 100, 200, 300, 400 extend either longitudinally or azimuthally, other embodiments may have off-axis metallic fibres.

The metallic fibres comprised in a tank of the invention may be co-wound with a carbon-fibre tow during manufacture of the tank.

What is claimed is:

1. A composite storage tank for gaseous hydrogen, the tank comprising a composite wall enclosing a gas storage volume and a metallic fibre which is susceptible to embrittlement by hydrogen incorporated within the composite wall, wherein ends of the metallic fibre extend through the exterior surface of the composite wall.

2. A composite storage tank according to claim 1, wherein the composite wall defines a cylindrical portion of the tank and the metallic fibre extends substantially parallel to the central longitudinal axis of the cylindrical portion of the tank.

3. A composite storage tank according to claim 2, wherein the composite wall includes a plurality of metallic fibres each of which is susceptible to embrittlement by hydrogen and which extends substantially parallel to the central longitudinal axis of the cylindrical portion of the tank, the ends of each metallic fibre extending through the exterior surface of the composite wall, and wherein each metallic fibre is located at a respective azimuthal position with respect to the central longitudinal axis of the cylindrical portion of the tank.

4. A composite storage tank according to claim 1, wherein the composite wall defines a cylindrical portion of the tank, the metallic fibre extends azimuthally at a single axial position with respect to the central longitudinal axis of the cylindrical portion of the tank and the ends of the metallic fibre extend through the exterior surface of the composite wall.

5. A composite storage tank according to claim 4, wherein the composite wall includes a plurality of metallic fibres each of which is susceptible to embrittlement by hydrogen and which extends azimuthally at a respective axial position with respect to the central longitudinal axis of the cylindrical portion of the tank, and wherein the ends of each metallic fibre extend through the exterior surface of the composite wall.

6. A composite storage tank according to claim 1, wherein the composite wall defines a cylindrical portion of the tank and includes first and second sets of metallic fibres each metallic fibre being susceptible to embrittlement by hydrogen, metallic fibres of the first set each extending substantially parallel to the central longitudinal axis of the cylindrical portion of the tank at a respective azimuthal position and metallic fibres of the second set each extending azimuthally at a respective axial position with respect to the central longitudinal axis of the cylindrical portion of the tank, and wherein the ends of each metallic fibre extend through the exterior surface of the composite wall.

7. A composite storage tank according to claim 1, wherein the composite wall comprises an organic matrix composite.

8. A composite storage tank according to claim 1, wherein the tank comprises a polymer liner in contact with the interior surface of the composite wall.

9. A composite storage tank according to claim 1, wherein at least one metallic fibre incorporated within the composite wall is pre-stressed.

10. A composite storage tank system comprising a composite storage tank according to claim 1 and means for measuring the electrical resistance of the or each metallic fibre.

11. An aircraft comprising a composite storage tank system according to claim 10, and at least one of a polymer electrolyte membrane (PEM) fuel cell and a hydrogen-burning gas turbine engine, the PEM fuel cell and/or the gas turbine engine being arranged to receive gaseous hydrogen from the composite storage tank of the composite storage tank system.

* * * * *